Sept. 1, 1959 L. SHAPIRO 2,902,539
COLOR-CORRECTION SYSTEMS
Filed Sept. 10, 1953 2 Sheets-Sheet 1

INVENTOR.
Louis Shapiro
BY Morris Rabkin
ATTORNEY

Sept. 1, 1959 L. SHAPIRO 2,902,539

COLOR-CORRECTION SYSTEMS

Filed Sept. 10, 1953 2 Sheets-Sheet 2

INVENTOR.
Louis Shapiro
BY Morris A. Rabkin
ATTORNEY

United States Patent Office 2,902,539

Patented Sept. 1, 1959

2,902,539

COLOR-CORRECTION SYSTEMS

Louis Shapiro, Haddonfield, N.J., assignor to Radio Corporation of America, a corporation of Delaware Application September 10, 1953, Serial No. 379,351

15 Claims. (Cl. 178—5.2)

This invention relates to color-correction systems for color-reproduction processes, and more particularly to a system for checking and adjusting a color-correction computer employed therein.

In an article in the "Journal of the Optical Society of America, volume 38, Number 4, April 1948, entitled "Color-Correction in Color Printing" by Arthur C. Hardy and F. L. Wurzburg, Jr., there is described a system for obtaining color corrected negatives from uncorrected color separation positives. Color separation negatives are made by photographing a colored subject through a red filter, a green filter, and a blue filter. These three uncorrected negatives are then used to provide three uncorrected photographic positives which are monochrome representations of a set of tri-stimulus values of the original subject. The color separation negatives cannot be directly used for making printing plates for truly reproducing the original subject without the application of correction techniques. The spectral characteristics of the printing inks and paper stock and other factors in the printing process are factors for which allowances must be made. The article above mentioned describes a system wherein the three uncorrected color separation positives are scanned simultaneously by a light source and three photocells to provide three electrical signals. These three signals are then applied to a computer which computes the required corrections and then provides, as an output, three or four corrected electrical signals. Each of these signals in turn is used to control the intensity of a light to which a sensitized photographic plate is exposed. With the mechanism described in the article, the three uncorrected separation positives are scanned simultaneously while a sensitized photographic plate is exposed to the controlled light. A line by line scan is used and this complete scan is repeated three times while exposing three separate photographic plates, or four times where a four color process is desired. Of course, each time a scan is made a different corrected output signal controls the exposure light. The resultant photographic plates are color corrected and may be used for making printing plates.

In the U.S. patent to Hardy et al., No. 2,434,561, there is described a color-correction computer for generating the corrected recording signals. This computer provides a solution of the Neugebauer equations reproduced below and described in the aforementioned patent.

$$X=(1-c)(1-y)(1-n)X_w+c(1-m)(1-y)(1-n)X_c+m(1-c)(1-y)(1-n)X_m+y(1-m)(1-c)(1-n)X_y+cm(1-y)(1-n)X_{cm}+cy(1-m)(1-n)X_{cy}+my(1-c)(1-n)X_{my}+cmy(1-n)X_{cmy}(1-n)X_{cmy}+nX_n$$

$$Y=(1-c)(1-m)(1-y)(1-n)Y_w+c(1-m)(1-y)(1-n)Y_c+m(1-c)(1-y)(1-n)Y_m+y(1-m)(1-c)(1-n)Y_y+cm(1-y)(1-n)Y_{cm}+cy(1-m)(1-n)Y_{cy}+my(1-c)(1-n)Y_{my}+cmy(1-n)Y_{cmy}+nY_n$$

$$Z=(1-c)(1-m)(1-y)(1-n)Z_w+c(1-m)(1-y)(1-n)Z_c+m(1-c)(1-y)(1-n)Z_m+y(1-m)(1-c)(1-n)Z_y+cm(1-y)(1-n)Z_{cm}+cy(1-m)(1-n)Z_{cy}+my(1-c)(1-n)Z_{my}+cmy(1-n)Z_{cmy}+nZn$$

There are three equations in four unknowns to express the tristimulus effects of a four-color reproduction. The unknowns are *c, m, y* and *n*, which represents the amounts of the ink, cyan, magenta, yellow and black, to be printed, or proportional printing areas of four printing plates (one for each color) at the element of the original subject to be reproduced. X, Y and Z are the known tristimulus values (red, green and blue) of the original element, which are provided by the uncorrected signals from the scanning photocells, and which are to be reproduced by *c, m, y* and *n*. $X_w$ . . . $Z_n$ represent constant multipliers determined by the paper to be used in the reproduction and by the characteristics of the individual inks and of overprint combinations of them. Each of the Neugebauer equations equates a measured tristimulus value. For example, in the equation for X (assuming X to be red) the magenta, yellow and magenta-yellow overlay terms will normally be most important, and the corresponding constants, $X_m$, $X_y$ and $X_{my}$, will normally have values giving greater weight to these terms.

The color-correction computer solves the Neugebauer equations by generating *c, m, y* and *n* signals that are compatible with each other and with the tristimulus values of the original subject. The computer may be considered, in one sense, as translating the colored subject in one medium, such as color photography, to a substantially different medium, that of printing inks. However, it is generally impossible to reproduce the saturation and luminance, or brightness, ranges of a colored subject with the standard printing inks on paper stock. This is due to the fact that the color gamut or range of saturation and luminance encompassed by a set of four printing inks and paper stock is less than that encompassed by photographic dyes on artists' pigments. Saturation is limited by lack of a sharp spectral band characteristic of the inks. Luminance in the reproduction is limited by the fact that the paper stock gives less than 100% reflectance, while the printed black ink gives greater than 0% reflectance.

The limitations of the printing inks in the reproduction of a subject is indicated graphically in Figure 1 of the accompanying drawings, in which there is shown a chromaticity diagram of the type described in the book "Handbook of Colorimetry" by Hardy, M.I.T., 1936, page 10. The solid line 10 represents the locus of all the spectrum colors; and the area within this solid line represents the gamut of real colors. The area within the broken-line triangle 12 may be considered as representing the gamut of colors attainable in an original subject, such as a photograph; and the area within the smaller polygon 14 may be considered as representing the gamut of colors attainable in a four-color reproduction with standard printing inks. It is seen, therefore, that the computer compresses the gamut of colors in the original subject to a gamut attainable by the printing inks.

As described in the Hardy patent cited above, the constant multipliers of the Neugebauer equations may be set into the computer by scanning a set of test patches of the paper stock, the inks and overlays thereof. Each of these patches, in turn, is scanned and, at the same time, potentiometers in the computer are adjusted manually until meter readings indicate that these patches would be reproduced as desired. After these adjustments have been made, the computer is then in condition to operate within essentially the full color gamut attainable with the inks and paper. However, the computer generally will still not be in condition to provide proper solutions for the average subject having wide saturation and brightness ranges.

The reason for this is that the computer is concerned only with solving the Neugebauer equations; that is, in providing ink values that have the same colorimetric relationships that the tristimulus values of the original subject have. Consequently, in order to arrive at a consistent and compatible solution more or less ink than can be printed may be required for one or more of the colors. Thus, if the computer range of ink values is 0% to 100% for each color, in an area of extreme saturation or brightness, the solution attempted by the computer may call for one or more ink values of less than 0% or greater than 100%. In short, where the tristimulus values of areas of the original subject lie outside the color gamut of the inks, the solutions of the equations for these areas are not directly attainable with the printed inks. Under such circumstances, the computer is said to be "out-of-control." With the computer out-of-control, color information is lost. This results in deteriorated picture quality, such as loss of detail in areas of high and low saturation and brightness.

In order to bring the computer into "control," that is provide an attainable solution in *c*, *m*, *y* and *n* for each area of the subject, it is then necessary to change the values of the constant multipliers. In effect, these changes compress the color gamut of the original subject as it is seen by the computer. Since some compromise in faithfulness of reproduction is generally necessary, esthetic considerations and the purpose of the reproduction become important in changing the constant multipliers. In order that the saturation and brightness ranges of the printed reproduction be an optimum, it is necessary to bring the computer into control for each subject to be reproduced. This is evident when the wide variations of the character of subjects for reproduction are considered.

Present methods for achieving color control of the computer are based on the use of a stationary spot of light on the subject. The resulting color information is supplied to the computer, and the output signals are checked to determine if the computer is in control. To insure control of various colors and degrees of brightness, a control check is made over a number of different picture areas representing extreme situations. In order to choose these check areas a considerable amount of colorimetric experience is required. This operation is time consuming and requires considerable care in order not to miss any out-of-control areas. More time is wasted by such procedures since areas already in control are covered. Furthermore, the size of the light spot is only a few thousands of an inch in diameter, so that skill and experience are required to place the spot at the point that has the extreme effect on computer control. Without such placement, maximum overall picture control from resulting adjustments is not achieved.

Not withstanding these disadvantages, checking color control with a stationary light spot may still be appropriate in the slow mechanical scanner described in the aforementioned article. However, where an electronic scanner system is employed using a scanning kinescope tube, such as described in the copending patent application of Haynes, Serial No. 264,117, now Patent No. 2,740,828, issued April 3, 1956, assigned to this assignee, additional disadvantages and problems arise. When a stationary light spot in a kinescope is used for checking color control, the kinescope screen may be damaged if the spot is kept at normal intensity. At reduced intensity the light spot gives erroneous picture information to the computer. A defocussed spot imposes additional linearity requirements on the relationship of current to light emission where the kinescope screen is fundamentally nonlinear. Furthermore, normal scanning speeds utilize, to an important extent, the transient characteristics of the kinescope screen.

Consequently, a stationary spot results in different light output and, hence, erroneous information to the computer.

Accordingly, it is an object of this invention to provide a novel system for checking and adjusting color control of a color-correction computer using normal scanning speeds.

Another object of this invention is to provide a simple, system for checking color control of a color-correction computer whereby color control may be achieved by means of a set of routine operations reducing to a minimum the skill and experience required.

Still another object of this invention is to provide a simple, fast and reliable apparatus for determining whether a color-correction computer is out-of-control, the character of the out-of-control, and the location thereof.

Yet another object of this invention is to provide a fast and reliable method for checking and adjusting color control of a color-correction computer.

These and other objects of this invention are achieved in an embodiment of this invention employing a color-correction computer of the type described in the Hardy patent cited above, and an electronic scanning system of the type described in the Haynes application cited above. The subject to be reproduced, in the form of three color separation positives, is scanned by a flying spot scanner or kinescope tube. The scanning light spot is deflected in a normal raster scanning manner, with one vertical sweep per picture and as many horizontal scans as required by resolution and other considerations. The light transmitted by the color separations is converted to electrical signals which are applied as inputs to the color-correction computer.

At one point of the computer system, rectangular wave outputs are taken which represent the corrected ink dot values. The percentage ink values of each color are represented by a 0% to 100% duty cycle of the waves generated by a square wave generator for that color. The limits of 0% and 100% represent zero and full color respectively, but indicate loss of control by the computer since the capacity for further duty cycle variation in one direction is lost at each of these points. The control condition of the computer is determined by monitoring the A.-C. components of each of the four computer outputs, *c*, *m*, *y* and *n*. Loss of the A.-C. component of any ink signal for a substantial period indicates that the percentage of ink required in not physically attainable. Relay means are provided which produce a switching signal for controlling first, means indicating the character of out-of-control, second, the vertical deflection of the kinescope, and, third, means indicating the location on the subject of the out-of-control area.

The residual direct voltage level of the particular ink signal that is out-of-control is used to light one of two lamps to indicate the direction in which the realizable percentage of ink is lost, that is to say, whether less than 0% or greater than 100%. The relay switching signal activates this indicator only when the A.-C. signal is lost.

The relay switching signal is also used to terminate further vertical deflection of the scanning light spot, but the horizontal scan remains unaffected. Thus, the constant-multiplier adjustments in the computer may be performed with the horizontal scan continuing. When the indicator lights stop flashing, the computer adjustments are completed, and the vertical scan is reinstated until the next out-of-control area is located.

Where successive lamp flashes indicate a plurality of out-of-control areas on the same horizontal line, the areas may be treated singly by blanking out various portions of the horizontal scan. By backing up the blanking of the horizontal scan until a light just stops or starts flashing, the location of the out-of-control area is pin-pointed. The blanking signals are provided by a single-shot multivibrator, having an adjustable reset period, which is activated by the relay switching signal to receive trigger pulses from the horizontal sawtooth generator.

The novel features of this invention as well as the invention itself, both as to its organization and mode of operation, may be better understood from the following description when read together with the accompanying drawings, in which.

Figure 2:
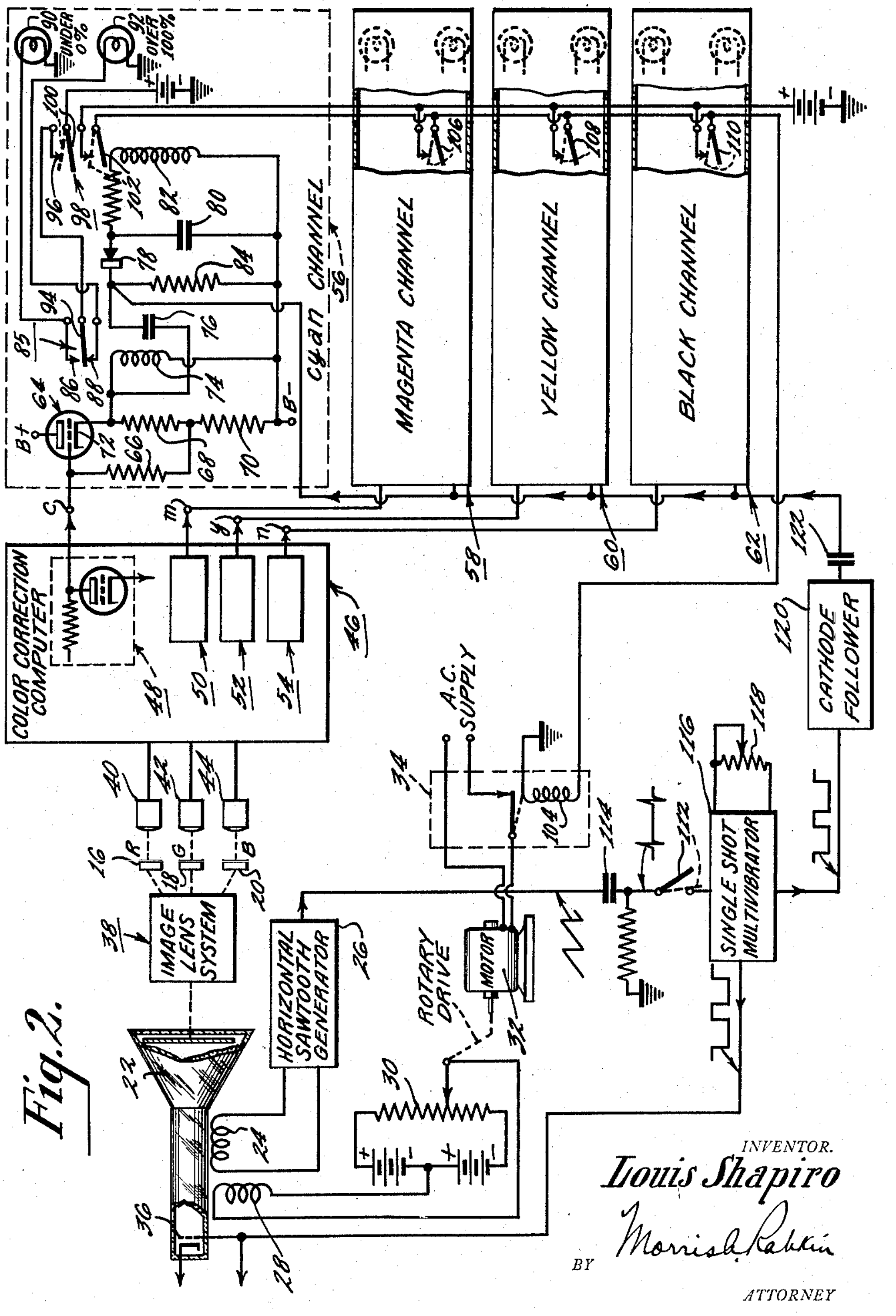
Figure 2 is a block diagram of a color-correction system embodying this invention, including schematic circuit diagrams of portions of the system.

Referring now to Figure 2 of the drawings, there is shown a color-correction system embodying this invention. A subject in color to be reproduced is shown in the form of three transparent color-separation positives 16, 18, 20. These color-separation positives may be prepared from negatives that are exposed through red, green and blue filters. A flying spot tube 22 in the form of a cathode-ray tube providing a spot of light of a high lumen content, is used to scan the three transparencies 16, 18, 20. The flying spot tube 22 is of the type described in an article in "Electronics," June 1948, page 124, entitled, "The Flying Spot Video Generator." The horizontal deflection coils 24 are energized by an appropriate form of horizontal sawtooth generator 26. The vertical deflection coils 28 are energized through a vertical sawtooth generator of the type employing a variable potentiometer 30 driven by a constant speed motor 32. The power supply is connected to the motor 32 through a circuit breaker 34 of the trip coil type discussed in greater detail below. The kinescope tube 22 has an intensity control electrode 36 as well as the other usual cathode-ray tube electrodes (not shown).

A lens system 38 images the scanning light spot on corresponding areas of each color-separation 16, 18, 20. The light passing through each color-separation is directed by appropriate lenses (not shown) to an associated photo tube 40, 42, 44. The photo tubes convert the variations of light transmitted through the three transparencies into electrical signal variations. These three electrical signals are applied to the inputs of a color-correction computer 46, which, for the purpose of this embodiment, is that described in the Hardy patent cited above. The computer 46 computes the corrections for the input signals that are required to produce a set of corrected color-separations. For the purpose of this invention, the computer outputs that are used are the rectangular waves generated by four squarewave generators 48, 50, 52, 54, which are those shown in Figures 3A, 5, and 5A of the Hardy patent. Each of these outputs is taken from the anode of an output stage that forms a part of each squarewave generator 48, 50, 52, 54. The computer outputs correspond to corrected electrical signals representing the ink dot sizes or portions of ink for each of the four colors to be printed; cyan, magenta, yellow and black.

Each of the computer outputs is applied to a different monitoring channel 56, 58, 60, 62. The four monitor channels are identical; only the details of the cyan channel 56 are shown in Figure 2. The cyan signals are applied to the control grid of a cathode follower 64 stage of high input impedance. A grid resistor 66 is connected between the control grid of the cathode follower 64 and the junction of a pair of cathode resistors 68, 70. These resistors represent a bias producing network insuring a high input impedance. The cathode 72 of the cathode follower 64 is also connected to one end of a first relay coil 74 which has its other end connected to the negative side B— of the source of operating potential for the cathode follower tube. The cathode 72 of the cathode follower is also coupled through a capacitor 76 to the cathode of a diode rectifier 78. The anode of the diode 78 is connected through a resistance-capacitance time constant network 80 to one end of a second relay coil 82, the other end of which is connected to B—. A resistor 84 connected between the cathode of the diode 78 and B— provides a D.-C. return for the diode.

The first relay 74 controls a single-pole, double-throw switch 85, the fixed contacts 86, 88 of which are connected to two indicating lamps 90, 92 labelled "over" and "under" respectively. The movable contact 94 of this indicator switch 85 is connected to one of the fixed contacts 96 of a triple-pole, single-throw switch 98 controlled by the second relay coil 82. The first movable contact 100 of the second switch 98 controlling the indicator switch 85 is connected to a source of potential for the indicating lamps 90, 92. Another set of contacts 102 of the second switch is connected in circuit between a source of potential and the trip coil 104 of the circuit breaker 34 for the constant speed motor 32. Corresponding sets of contacts 106, 108, 110 of the second relay switch in each of the other monitor channels 58, 60, 62 are connected in parallel in the same trip-coil circuit. A third set of contacts 112 of this second relay switch 98 connects the horizontal sawtooth generator 26 and a resistance-capacitance differentiating network 114 to a single-shot multivibrator 116. The multivibrator 116 may be of the form described in "Radio Engineering" by Terman, 3rd edition, page 591, modified by the use of an adjustable resistor 118 in the reset time-constant network. The output of the single-shot multivibrator 116 is connected to the intensity control electrode 36 of the kinescope; and it is also connected through a cathode follower 120 and coupling capacitor 122 to the cathode of each of the diode rectifiers 78 in the four monitor channels 56, 58, 60, 62.

The circuits are shown in Figure 2 with the second relay coil 82 energized in each channel, and the switches 98 controlled thereby held open. The trip coil 104 is deenergized and the circuit breaker switch 34 applying power to the constant-speed motor 32 is closed so that the vertical scan of the kinescope is operating. The circuit breaker 34 is of the type that remains open after the trip coil is energized until manually reclosed.

Figure 1:
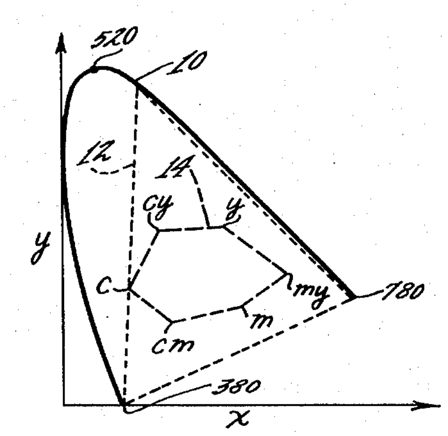
Figure 1 (discussed above) is a graphical chromaticity diagram.
Figure 3:
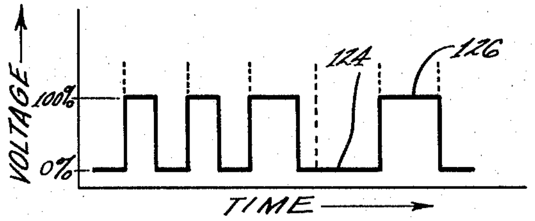
Figure 3 is a graphical diagram of the output waveforms from a color-correction computer.

As shown in Figure 3, the outputs from the computer 46 are rectangular waves of 0% and 100% duty cycle (broken lines define a cycle), with the last two cycles shown 124, 126 being 0% and 100% respectively. Within that range, as discussed above, the computer 46 is in control. The actual end limits of 0% and 100%, however, indicate loss of control, since the capacity for further duty cycle variation in one direction is lost at each of these points. Therefore, it is seen that there is an A.-C. component in the computer output, during each cycle the computer is in control. With the loss of this A.-C. component the computer is out-of-control, that is to say, either less than 0% or more than 100% of ink is required by the computer solution. The residual direct voltage level of the computer indicates whether the computer solution is greater than 100% or less than 0% of ink.

Figure 4:
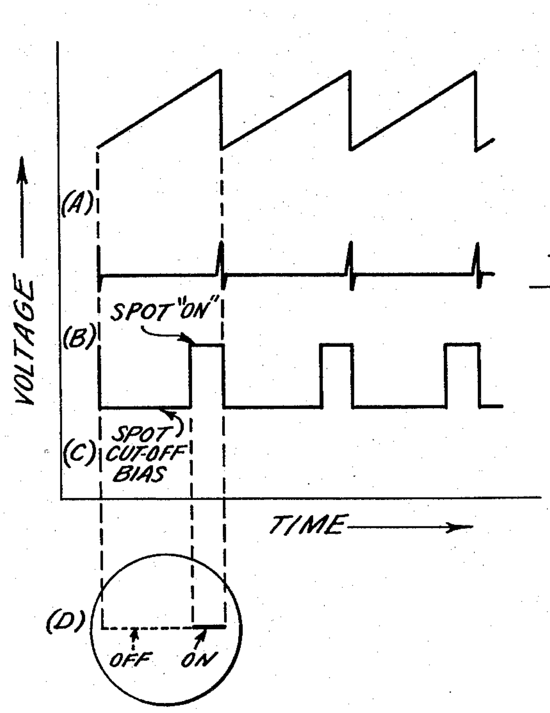
Figure 4 is a graphical diagram of waveforms occurring at some of the circuits of the system.

Each monitor channel 56, 58, 60, 62 functions to detect whether the computer is in or out of control for the particular ink and in what direction. As long as the computer is in-control, the A.-C. component of the signal is present. The A.-C. signal is separated from the D.-C. signal by the capacitor 76 coupling the cathode 72 of the cathode follower to the cathode of the diode 78. The diode 78 rectifies the A.-C. signal and the resulting D.-C. component passes through the second relay coil 82 holding the movable contacts of the second switch 98 open. When an out-of-control area for cyan is reached, the A.-C. signal component in the cyan channel 56 disappears, and if this out-of-control area is sufficiently large, as determined by the time constant network 80, the second relay coil 82 is deenergized and all three movable contacts close. Depending upon the voltage level at the cathode 72 of the cathode follower, there is a high or low current flowing through the first relay coil 74 that positions the movable contact 94 of that relay in the "over" or "under" positions. As shown in Figure 2, it is in the "over" position. A circuit is then completed through the "over" indicating lamp 92 for cyan through the closed contacts 94, 88 of the first relay and the indicator control contacts 96, 100 of the second relay switch 98 to a source of supply. Thus, the "over" indicating lamp 92 flashes, indicating out-of-control of the computer as well as the particular channel and the direction of the out-of-control. At the same time, the second set of contacts 102 of the second relay 82 closes, energizing the trip coil 104 of the circuit breaker 34 for the motor supply, and the constant speed motor 32 is stopped. The vertical scan is halted as a result, and the scanning light spot is maintained on the horizontal line of the out-of-control area. The horizontal scan continues, and the "under" indicating lamp 72 for cyan flashes as long as the out-of-control condition continues. The color-correction computer 46 may then be adjusted, and the indicating lamp stops flashing when the adjustment is completed. The circuit breaker switch 34 for the constant speed motor is closed to reinstate the vertical scan, and the operation is repeated when another out-of-control area is located. The entire subject may be rapidly scanned in this manner. The operation is the same for all of the four monitor channels. Where more than one out-of-control area exists on the same horizontal line, each is detected and indicated separately.

Where successive light flashes indicate a plurality of out-of-control areas on the same horizontal line, an additional control circuit permits treating singly these areas. When the second relay 82 is energized a third set of contacts 112 closes, connecting the horizontal sawtooth generator 26 to the single-shot multivibrator 116 through the differentiating network 114. Sawtooth voltage pulses from the horizontal generator are differentiated to produce a train of triggering pulses for the multivibrator. By adjusting the time-constant resistor 118 of the multivibrator 116 the duration of the negative output pulses produced by the multivibrator may be determined. These negative pulses are applied to the intensity control electrode 36 of the kinescope to blank out a portion of the horizontal scan. The waveforms producing this condition are shown in Figure 4, in which A is the sawtooth wave, B is the train of differentiated pulses, C the train of negative rectangular pulses produced by the multivibrator, and D shows the corresponding condition of the kinescope face, a dotted line indicating a blank condition of the scanning trace and a full line indicating the scanning trace is on. The leading edge of the negative multivibrator pulse is positioned by the differentiated trigger pulse synchronizing the blanking of the horizontal scan with the horizontal deflection wave. The trailing edge of the negative multivibrator pulse is determined by the adjustment of the time-constant resistor of the multivibrator. In order that the monitor channels are disabled during the blanking period, when the computer output is out-of-control, the negative multivibrator pulses are also applied through a coupling capacitor 122 to the cathode of each diode rectifier 78. Thus, there is a signal to maintain the second relay coils 82 energized during the blanking period.

By backing up the blanking of the horizontal scan until a single indicating lamp just starts flashing, the location of the out-of-control area is pinpointed. In this way, only the portion of the horizontal scan covering a single out-of-control area continues, and the computer may be readily adjusted. When that is completed, the blanking of the horizontal scan is backed up further until the next out-of-control area is located. By this arrangement it is also possible to know precisely where the out-of-control condition exists. For example, the operator may open the housing for a view of the separations and of the line formed by the scanning light spot pointing directly to the out-of-control area. By examining a colored duplicate of the colored subject, the colorimetric relation of the particular out-of-control area to the entire subject may be determined.

This invention is not limited to the particular type of color-correction computer described above in which the outputs are rectangular waves having a 0% to 100% duty cycle. Any other computer may be used in which the outputs are of one form or within predetermined limits when in-control, and of another form or without those predetermined limits when out-of-control. In any case, a monitor channel is provided for each of the computer outputs that detects the change of output signals from in-control to out-of-control and produces a switching signal. This switching signal is then used to halt further vertical deflection, activate the indicator system, and blank a portion of the horizontal scan. The invention is not limited to the use of relays as switching devices, and electronic switches may be used where faster response is desired. Also, other indicator systems may be used such as an audible signal device or an oscilloscope display system.

Since the size of an out-of-control area that may be tolerated may vary for the particular purpose of the printed reproduction, the time-constant network of each rectifier circuit may be made adjustable. The time constant of this network should approximately equal the time the horizontal scan covers the tolerable size of out-of-control area on the subject.

As discussed above, the adjustment of the color-correction computer to bring an out-of-control area back into control involves adjustments of the values of the constant multipliers $X_w \ldots Z_n$ in the Neugebauer equations. During adjustment it is essential that the constant multipliers be changed only in certain ways to insure that the hue or chromaticity of the resultant corrected color is not thereby shifted or shifted appreciably, and that other repercussions (for example, the luminance-saturation relationships of in-control inks) are minimized. Esthetic considerations also become important in these adjustments. In general, if we consider the constant multipliers of the right-hand sides of the Neugebauer equations as a 9 x 3 matrix, out-of-control due to saturation difficulties may be corrected by reducing the values of the three constant multipliers of the proper column by a fixed ratio; while out-of-control due to luminance difficulties may be corrected by subtracting a fixed amount from the value of each of the three constant multipliers in the proper column. The proper column or columns in each case are determined by a colorimetric knowledge of the area of the subject where out-of-control occurred.

As is seen from the above description of this invention, a simple system for checking color control of a color-correction computer is provided. The subject in color may be rapidly scanned and the out-of-control areas are automatically indicated and the vertical scan halted so that adjustments of the computer may be readily made. Thus, by the apparatus and method of this invention, color-control checking is made a routine operation, reducing to a minimum the skill and experience required of an operator.

What is claimed is:

1. In a system for obtaining color-corrected records from a subject having color characteristics wherein said subject is scanned in two transverse directions by means of a scanning light source to provide uncorrected electrical signals representative of color components of said subject, and a color-correction computer generates corrected electrical signals in accordance with said uncorrected signals, said color-correction computer being in control when signals generated thereby are within predetermined limits, the combination with said scanning light source and said computer of apparatus for testing color control of said computer comprising switch means responsive to signals generated by said computer for controlling the scan of said subject in one of said transverse directions, and for indicating the state of control of said computer.

2. In a system for obtaining color-corrected records from a subject having color characteristics wherein scanning means scans said subject in two transverse directions to provide uncorrected electrical signals representative of color components of said subject, and a color-correction computer generates corrected electrical signals of one type in accordance with said uncorrected signals when said computer is in-control and signals of another type when out-of-control, the combination with said scanning means and said computer of apparatus for checking color control of said computer comprising means responsive to signals generated by said computer for controlling said scanning means to terminate scan in one of said transverse directions upon generation of signals of said another type.

3. In a system for obtaining color-corrected records from a subject having color characteristics, the combination of means for scanning said subject in two transverse directions to provide uncorrected electrical signals representative of color components of said subject, said scanning means including separate means for producing the scan in each of said two directions, a color-correction computer for generating corrected electrical signals in accordance with said uncorrected signals, said computer generating signals within predetermined limits when in control, and means for checking color control of said computer including means responsive to signals without said predetermined limits for terminating the operation of one of said scan producing means.

4. In a system for obtaining color-corrected records from a subject having color characteristics, the combination of means for scanning said subject in two transverse directions to provide uncorrected electrical signals representative of color components of said subject, said scanning means including means for producing a light spot, and separate means for producing deflection of said light spot in said two directions, a color-correction computer for generating corrected electrical signals in accordance with said uncorrected signals, said color-correction computer generating signals within predetermined limits when in control, and means for checking color control of said computer including means responsive to signals generated by said computer for controlling the operation of said deflection producing means.

5. In a system for obtaining color-corrected records from a subject having color characteristics, the combination as recited in claim 4 wherein said means responsive to signals generated by said computer for controlling the operation of one of said deflection producing means includes means for terminating further deflection of said light spot by said one deflection producing means when signals generated by said computer are not within said predetermined limits.

6. In a system for obtaining color-corrected records from a subject having color characteristics, the combination as recited in claim 4 wherein said means for checking color control of said computer further includes means for indicating the state of color control of said computer.

7. In a system for obtaining color-corrected records from a subject having color characteristics the combination as recited in claim 6 wherein said means for checking color control of said computer further includes means for indicating the location of areas of said subject where said computer is not in control responsive to signals generated by said computer not within said predetermined limits.

8. In a system for obtaining color-corrected records from a subject having color characteristics, the combination of means for scanning said subject in two transverse directions to provide uncorrected electrical signals representative of color components of said subject, said scanning means including a scanning cathode-ray tube having an intensity electrode, vertical and horizontal deflection elements, and separate means for applying deflection signals to said vertical and horizontal deflection elements, a color-correction computer for generating corrected electrical signals in accordance with said uncorrected signals, said color-correction computer generating signals of one type when in-control, and signals of another type when out-of-control, and means for checking color control of said computer including means responsive to signals of said another type for interrupting changes in magnitude of the deflection signals applied to said vertical deflection elements.

9. In a system for obtaining color-corrected records from a subject having color characteristics, the combination of means for scanning said subject in two transverse directions to provide uncorrected electrical signals representative of color components of said subject, said scanning means including a scanning cathode-ray tube having an intensity electrode, vertical and horizontal deflection elements, and separate means for applying deflection signals to said vertical and horizontal deflection elements, a color-correction computer for generating corrected electrical signals in accordance with said uncorrected signals, said color-correction computer generating signals of one type when in-control, and signals of another type when out-of-control, and means for checking color control of said computer including means responsive to signals of said another type for applying blanking signals of variable duration to said intensity control electrode to locate areas of said subject that are out of control.

10. In a system for obtaining color-corrected records from a subject having color characteristics, the combination of means for scanning said subject in two transverse directions to provide uncorrected electrical signals representative of color components of said subject, said scanning means including a scanning cathode-ray tube having vertical and horizontal deflection elements, a color-correction computer for generating corrected electrical signals in accordance with said uncorrected signals, said computer generating oscillating signals when in-control and direct signals of either high or low amplitudes when out-of-control, and means for checking color control of said computer including means for indicating high or low amplitudes of said corrected signals, and switch means responsive to the presence of oscillating signals for maintaining said indicating means inactive and responsive to the absence of said oscillating signals for a predetermined period for inactivating said indicating means.

11. In a system for obtaining color-corrected records from a transparent subject having color characteristics, the combination of a cathode-ray tube having a screen for producing a scanning light spot, and vertical and horizontal elements for deflecting said light spot, separate means for applying deflection signals to said vertical and horizontal deflection elements, photo-electric means for converting light transmitted through said subject to uncorrected electrical signals, a color-correction computer for generating corrected electrical signals in accordance with said uncorrected signals, said color-correction computer generating oscillating signals when in-control and substantially direct signals when out-of-control, and means for checking color control of said computer including means for indicating the amplitude of signals generated by said computer, and switch means responsive to the absence of said oscillating signals for a predetermined period for terminating further vertical deflection of said light spot and for activating said indicating means.

12. In a system for obtaining color-corrected records from a transparent subject having color characteristics, the combination of a cathode-ray tube having a screen for producing a scanning light spot, an intensity control electrode, and vertical and horizontal deflection elements, separate means for generating vertical and horizontal deflection signals, photoelectric means for converting light transmitted through said subject to uncorrected electrical signals representative of color components of said subject, a color-correction computer for generating corrected electrical signals in accordance with said uncorrected signals, said corrected signals being representative of a plurality of different ink colors, said computer generating oscillating signals when in-control and substantially direct signals of either of two amplitudes when out-of-control, and means for checking color control of said computer including a plurality of electrical channels with one for each of said ink colors and each coupled to said computer to receive the corrected signals of the same ink color, each of said channels including means for indicating the amplitude of said corrected signals of the associated ink color, and switch means responsive to the absence of oscillating signals for a predetermined period for terminating further vertical deflection of said light spot and for activating the indicating means in the same channel, and means for applying blanking signals of variable duration to said intensity control electrode responsive to operation of any one of said switch means.

13. In a system for obtaining color-corrected records from a subject having color characteristics wherein said subject is scanned in two transverse directions by means of a light source to provide uncorrected electrical signals representative of color components of said subject, and a color-correction computer is utilized to generate corrected electrical signals in accordance with said uncorrected signals, said color-correction computer being out-of-control when signals generated thereby are outside predetermined limits, the method of checking and adjusting color control of said computer comprising the steps of scanning said subject in two transverse directions, and, when an area in which said computer is out-of-control is located during said scanning, terminating said scanning in one of said directions but not in the other direction, and simultaneously with the scanning in said other direction after said terminating adjusting said computer to restore control.

14. In a system for obtaining color-corrected records from a subject having color characteristics, the combination of means for scanning said subject in two transverse directions to provide uncorrected electrical signals representative of color components of said subject, said scanning means including separate means for producing the scan in each of said two directions, color-correction means for generating corrected electrical signals in accordance with said uncorrected signals, and means for locating areas of said subject having certain color characteristics, said locating means including means responsive to certain values of said corrected signals corresponding to said certain color characteristics for terminating changes in the operation of one of said scan producing means.

15. In a system for obtaining color-corrected records from a subject having color characteristics, the combination of means for scanning said subject in two transverse directions to derive uncorrected electrical signals representative of color components of said subject, color-correction means for generating corrected electrical signals in accordance with said uncorrected signals and including means for adjusting the relation between a certain range of said corrected signals and the range of the derived uncorrected signals, and means for checking the operation of said correction means, said checking means including means for indicating corrected signals outside of said corrected signal range, and switch means responsive to said corrected signals within said corrected signal range for rendering said indicating means inactive and responsive to the absence of said corrected signals within said corrected signal range for a certain time period for rendering said indicating means active.

References Cited in the file of this patent

UNITED STATES PATENTS

| | | |
|---|---|---|
| 2,434,561 | Hardy | Jan. 13, 1948 |
| 2,657,257 | Lesti | Oct. 27, 1953 |